(12) United States Patent
Schinstock

(10) Patent No.: US 10,462,974 B2
(45) Date of Patent: Nov. 5, 2019

(54) TWO STAGE KNIFE FLOOR

(71) Applicant: DEERE & COMPANY, Moline, IL (US)

(72) Inventor: William P. Schinstock, Ottumwa, IA (US)

(73) Assignee: Deere & Company, Moline, IL (US)

( * ) Notice: Subject to any disclaimer, the term of this patent is extended or adjusted under 35 U.S.C. 154(b) by 167 days.

(21) Appl. No.: 15/617,305

(22) Filed: Jun. 8, 2017

(65) Prior Publication Data

US 2018/0027742 A1 Feb. 1, 2018

Related U.S. Application Data

(60) Provisional application No. 62/367,164, filed on Jul. 27, 2016.

(51) Int. Cl.
| | | |
|---|---|---|
| A01F 15/10 | (2006.01) | |
| A01D 90/04 | (2006.01) | |
| A01D 90/06 | (2006.01) | |
| A01F 15/02 | (2006.01) | |
| A01F 15/14 | (2006.01) | |

(52) U.S. Cl.
CPC .............. *A01F 15/10* (2013.01); *A01D 90/04* (2013.01); *A01D 90/06* (2013.01); *A01F 15/02* (2013.01); *A01F 15/148* (2013.01); *A01F 2015/107* (2013.01); *A01F 2015/108* (2013.01)

(58) Field of Classification Search
CPC .......... A01F 2015/107; A01F 2015/108; A01F 15/10; A01D 90/04; A01D 90/06
See application file for complete search history.

(56) References Cited

U.S. PATENT DOCUMENTS

| | | | |
|---|---|---|---|
| 5,819,517 | A | 10/1998 | Amanatidis et al. |
| 5,974,776 | A | 11/1999 | Prellwitz |
| 6,370,851 | B1 | 4/2002 | Uros et al. |
| 6,622,468 | B2 | 9/2003 | Lucand et al. |

(Continued)

FOREIGN PATENT DOCUMENTS

| | | |
|---|---|---|
| DE | 19717542 A1 | 10/1998 |
| DE | 19841598 A1 | 3/2006 |

(Continued)

OTHER PUBLICATIONS

European Patent Office; Extended European Search Report issued in EP17180260.6; dated Dec. 7, 2017; 5 pages.

*Primary Examiner* — Alicia Torres
(74) *Attorney, Agent, or Firm* — Taft Stettinius & Hollister LLP; Stephen F. Rost

(57) ABSTRACT

A harvesting machine may include a main frame, a rotor assembly rotatably coupled to the main frame, a top frame movably attached to the main frame forming a passageway for crop material between the top frame and the rotor assembly, a bottom frame movably attached to the top frame, a plurality of knives movably attached to the top and bottom frames, and an actuator operatively connected to one of the top frame and the bottom frames. The plurality of knives extends through slots in the top frame. The top and bottom frames and the plurality of knives are in a raised position when the actuator is in a first position. The top and bottom frames and the plurality of knives are in a lowered position when the actuator is in a second position, which enlarges the passageway and partially retracts the knives through the slots in the top frame.

17 Claims, 13 Drawing Sheets

(56) References Cited

U.S. PATENT DOCUMENTS

| | | |
|---|---|---|
| 6,640,699 B2 | 11/2003 | Vaiud |
| 6,912,835 B1 | 7/2005 | Chabassier |
| 7,404,284 B2 | 7/2008 | Viaud et al. |
| 7,694,504 B1 | 4/2010 | Vaiud et al. |
| 8,206,205 B2 | 6/2012 | Derscheid |
| 9,468,149 B2 | 10/2016 | Derscheid et al. |
| 9,526,214 B2 | 12/2016 | McClure et al. |
| 9,549,506 B2 | 1/2017 | McClure |
| 9,713,306 B2 | 7/2017 | Singh et al. |
| 2008/0028737 A1 | 2/2008 | Viaud et al. |
| 2008/0290198 A1 | 11/2008 | Benes et al. |
| 2012/0056024 A1 | 3/2012 | Isaac et al. |
| 2013/0167498 A1 | 7/2013 | Haycocks |
| 2013/0316770 A1 | 11/2013 | Haycocks |
| 2014/0021018 A1 | 1/2014 | Biziorek |
| 2016/0001294 A1 | 1/2016 | Bergmann et al. |
| 2016/0219792 A1 | 8/2016 | Singh et al. |

FOREIGN PATENT DOCUMENTS

| | | |
|---|---|---|
| DE | 102011013640 A1 | 9/2012 |
| DE | 102012007634 A1 | 10/2013 |
| DE | 102012008721 A1 | 11/2013 |
| DE | 102012009040 A1 | 11/2013 |
| DE | 102012109773 A1 | 11/2013 |
| DE | 102012112154 A1 | 6/2014 |
| DE | 102013007304 A1 | 10/2014 |
| DE | 202014003759 U1 | 9/2015 |
| EP | 1133914 A2 | 9/2001 |

TWO STAGE KNIFE FLOOR

CROSS-REFERENCE TO RELATED APPLICATION

This application claims priority to Provisional Patent Application Ser. No. 62/367,164, having the title "Two Stage Knife Floor" filed Jul. 27, 2016, the disclosure of which is incorporated herein by reference in its entirety.

FIELD OF THE DISCLOSURE

The present disclosure relates to a work machine for harvesting crop, and more particularly to a harvesting machine to cut crop including an articulating floor.

BACKGROUND

Hay and foraging equipment are utilized in the processing of plant material and include mowers, conditioners, flail choppers, windrowers, and balers for both dry and silage uses. The hay system, such as a square baler, includes a pickup mechanism, which picks crop material from the ground and supplies it to a bale-forming chamber. The bale-forming chamber receives the crop material and includes a plunger or piston that applies an axial force against an accumulation of the crop material to form a substantially square-shaped bale. The plunger or piston can further apply a force to a face of the bale to further densify the bale. Once the bale reaches a certain or desired density, the bale may be pushed and extruded out the rear of the baler.

Large square balers, round balers, and feeder wagons often include a pre-cutter feed-system to preprocess the crop to cut it to a shorter length before the bale formation to aid in mixing the crop into feed rations. The shorter length of crop is easier to mix compared longer length crop.

The pre-cutter feed-system comprises of a series of knives mounted to a structure, normally called the floor. It is common for these knives to be mounted in such a way that they can be lowered to bale with the knives lowered, if it is desired to not cut the crop. It is also common for the knives to be easily removed for service or replacement. It is further common for these knives to be protected with some sort of knife protection system to avoid knife damage if a foreign object is encountered such as a rock or metal object. This knife protection system allows the knife to lower when the foreign object is encountered. In these systems, the knife can be configured to automatically raise to resume operation with no operator input.

The majority of manufacturer's pre-cutter knife systems employ a knife engagement method to engage (raise) or disengage (lower) the knives which comprises of a roller that is forced against a surface of the knife. In this method, the roller pushes against a ramp or cam shape to push the knife through or above the floor surface. The knife travels upwardly until the roller enters into a depression or notch in the knife that holds the knife in the raised position. The notch is configured such that a relatively high force is necessary to move the spring loaded roller out of the notch to allow the knife to lower in the case of hitting a foreign object. To lower the knives manually, a mechanism pulls the roller out of the notch and away from the ramp-shaped profile of the knife allowing either gravity to lower the knife, or subsequent crop fed into the feed-system can push the knives down.

A common issue faced with pre-cutter knife systems is that the knives become stuck in place. A stuck knife is a problem, because freeing up the knife requires manual intervention and often requires the use of a tool to free the knife. Additionally, the end user becomes frustrated when discovering that one or more knives were not raised and previously harvested hay has not been cut.

A stuck knife results when exposed to many different types of conditions including: (1) a knife that is forced down from a foreign object during knife protection that does not automatically raise; (2) the knives are lowered to bale without cutting, and when knives are raised to resume cutting the knives do not raise; (3) the knives are lowered to unplug the rotor from the cab and when knives are raised to resume cutting the knives do not raise. Reasons for knives not raising include: (1) crop buildup between the knives and the slots in the floor that the knife passes through; and (2) crop buildup under the floor structure in the knife area that adds resistance to the knife and increases the required force to raise one or more knives. Some manufacturers have systems in which the knife system frame is mounted above the rotor. In these types of systems, similar problematic conditions occur.

Other problems result from the crop material being bunched at one place or otherwise non-uniformly distributed across the knives, which causes surges in the amount of power required to process the material encountered. If the material encountered is too thick or even includes some foreign material such as a piece of wood or a stone, a plug can be formed that causes the baling mechanism to be overloaded. In some machines, this requires operator intervention requiring the operator to stop the tractor to make an attempt to unplug the congested material by reversing the travel of the tractor to try to pull some of the material out. The presence of a plug often requires the operator to stop the drive mechanism and then release various aspects of the baler mechanism associated with the flow of the material so that the plug can be removed either manually or by operating portions of the baler with mechanisms in their non-normal operating positions to try to clear the plug from the baler. Once the plug is removed, the operator repositions the mechanisms that were disengaged, moving them back into a normal operating position. These conventional techniques require at least some limited operator intervention which can potentially damage the machine by operating it with only some of the mechanisms being moved to a released position.

In other aspects, various unplugging devices are included in the feeding systems on hay and forage equipment which include drop floors, knife disengagement, reversers, rotor movement, pickup baffle positioners, power feed clutches, and the like. These devices are activated electrically, hydraulically, PTO driven, or a combination thereof. These devices are activated individually to make the necessary steps to relieve tight plugs and to then sequentially feed crops through the feeding device. Actuating these devices individually is cumbersome, time-consuming and difficult to understand for inexperienced operators.

SUMMARY

The present disclosure describes a two-part frame for the knife floor of a hay harvesting system. Robust knife engagement is provided as well as faster and easier unplugging from the operator station, easier service cleaning of system, ability to unplug machine from the operator station by lowering floor and knives without unlocking the knives from the locked engaged position, and an ability to re-set stuck knives from the operator station.

In one embodiment, there is provided a harvesting machine including a machine main frame and a rotor assembly coupled to the frame wherein the rotor assembly is adapted to move crop. A knife system assembly is disposed adjacently to the rotor assembly and coupled to the machine main frame, wherein the knife system assembly includes a first frame assembly, and a second frame assembly disposed adjacent to the first frame assembly. One of the first frame assembly and the second frame assembly is movably coupled to the other of the first frame assembly and the second frame assembly, and one of the first frame assembly and the second frame assembly is movably coupled to the machine main frame. A knife support system is coupled to the second frame assembly. The knife system includes a plurality of knives configured to cut crop material.

In one exemplary embodiment, the first frame assembly is a top frame assembly and the second frame assembly is a bottom frame assembly.

The plurality of knives, in other embodiments, are coupled to the second frame assembly only or coupled to both the first frame assembly and to the second frame assembly partially.

In another embodiment, there is provided a baler including a frame having a frame coupler, a pickup mechanism coupled to the frame and adapted to collect crop, and a pre-compression chamber coupled to the frame rearward of the pickup mechanism. A material flow path is defined at least between the pickup mechanism and pre-compression chamber. A feeder system is coupled to the frame along the material flow path and between the pickup mechanism and the pre-compression chamber. The feeder system includes a feeding mechanism for transferring crop received from the pickup mechanism to the pre-compression chamber and a frame assembly positioned adjacent to the feeding mechanism. The frame assembly includes a top assembly and a bottom assembly wherein the top assembly is movably coupled to the machine frame at the frame coupler and the bottom assembly is movably coupled to the top assembly at a top coupler location. The bottom assembly includes a knife support system wherein the knife system includes a plurality of knives oriented, at least in part, along the material flow path. The top assembly and the bottom assembly are configured to move together from a first position to a second position, and the bottom assembly is configured to move from the second position to a third position while the top assembly remains at the second position.

In a further embodiment, there is provided a harvesting machine including a main baler frame and a cutting device for cutting agricultural crops, wherein the cutting device includes a rotor assembly adapted to move crop. A top frame includes a sheet which provides a passageway for crop to move, wherein the top frame is movably attached to the baler frame. A bottom frame is movably attached to the top frame and a plurality of knives are movably attached to the top frame and also attached to the bottom frame. The top frame and bottom frame are movable such that the top frame and bottom frame move away from rotor and bottom frame moves relative to the top frame.

In another aspect, there is provided a harvesting machine including a main baler frame and a cutting device for cutting agricultural crops. The cutting device includes a rotor adapted to move crop. A bottom frame is movably attached to the baler frame. A top frame includes a sheet which provides a passageway for crop to move, wherein the top frame is movably attached to the bottom frame. A plurality of knives is movably attached to the top frame and also attached to the bottom frame. The top frame and bottom frame are movable such that top frame and bottom frame move away from rotor and the bottom frame moves relative to the top frame.

In still another aspect, there is provided a harvesting machine including a cutting device for cutting agricultural crops. The cutting device includes a rotor assembly adapted to move crop. A top frame includes a sheet which provides a passageway for crop to move. A bottom frame is disposed adjacently to the top frame. A plurality of knives is movably attached to the top frame and also attached to the bottom frame. An actuator is operatively connected to one of the top frame and the bottom frame and adapted to move the bottom frame with respect to the top frame. An operator control is operatively connected to the actuator, wherein the top frame and the bottom frame both move responsively to the operator control and the responsive movement provides a resetting of the plurality of knives to a cutting position.

In another embodiment, there is provided a harvesting machine including a main frame, a rotor assembly rotatably coupled to the main frame and configured to move crop material, and a top frame. The top frame is movably attached to the main frame and forms a passageway for crop material between the top frame and the rotor assembly. A bottom frame is movably attached to the top frame or main frame. A plurality of knives is movably attached to the bottom frame or the top and bottom frames, wherein the plurality of knives extends through slots in the top frame. An actuator is operatively connected to one of the top frame and the bottom frame. The top and bottom frames and the plurality of knives are in a raised position when the actuator is in a first position. The top and bottom frames and the plurality of knives are in a lowered position when the actuator is in a second position, which enlarges the passageway between the top frame and the rotor assembly and at least partially retracts the knives through the slots in the top frame.

In still another embodiment, there is provided a harvesting machine including a main frame, a rotor assembly rotatably coupled to the main frame and configured to move crop material, and a top frame movably attached to the main frame wherein the top frame forms a passageway for crop material between the top frame and the rotor assembly. A bottom frame is movably attached to the top frame or main frame. A plurality of knives is movably attached to the bottom frame of the top and bottom frames wherein the plurality of knives extends through slots in the top frame. The bottom frame engages an indentation on a non-cutting edge of the knives to maintain the plurality of knives in a locked condition. An actuator is operatively connected to one of the top and bottom frames with the top and bottom frames and the plurality of knives being in a raised position when the actuator is in a first position. The top and bottom frames and the plurality of knives are in a lowered position when the actuator is in a second position, which enlarges the passageway between the top frame and the rotor assembly and at least partially retracts the knives through the slots in the top frame while maintaining the knives in the locked condition.

In a further embodiment, there is provided a harvesting machine including a main frame, a rotor assembly rotatably coupled to the main frame and configured to move crop material, and a top frame movably attached to the main frame. The top frame forms a passageway for crop material between the top frame and the rotor assembly. A bottom frame is movably attached to the top frame or main frame. A plurality of knives is movably attached to bottom frame or the top and bottom frames with the plurality of knives extending through slots in the top frame. The bottom frame engages an indentation on a non-cutting edge of the knives to maintain the plurality of knives in a locked condition, and the bottom frame disengages from the indentation in one or more of the plurality of knives so that the knives can rotate away from the rotor assembly in a tripped condition. An actuator is operatively connected to one of the top and bottom frames. The top and bottom frames are in a raised position when the actuator is in a first position. The bottom frame moves to a lowered position relative to the top frame when the actuator is in a second position causing the bottom frame to reengage the indentation on the non-cutting edge of the knives, which returns the knives to the locked condition.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1A:
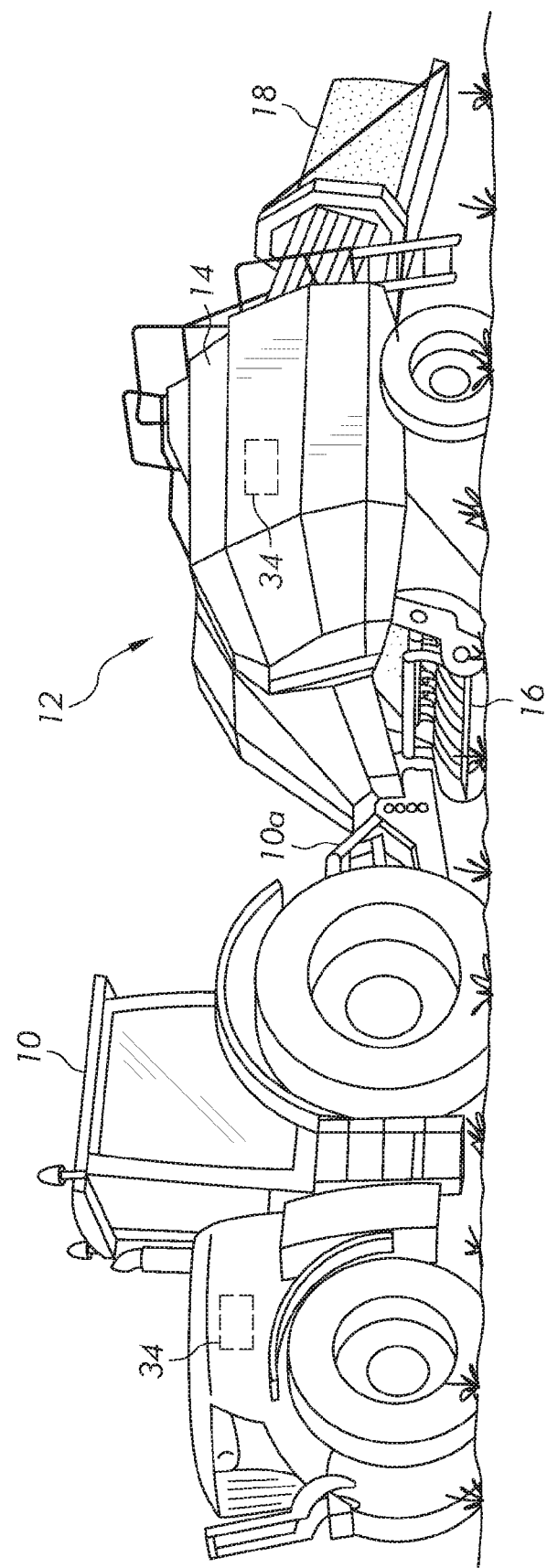
FIG. 1A is a perspective view of an example baler towed by an agricultural vehicle.

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Referring now to FIG. 1, large square baler 12 may be towed across a field by agricultural vehicle 10. (It will be understood that various other configurations are also possible. For example, the disclosed systems and methods may be utilized with a variety of balers or other harvesting equipment.) Baler 12 may include housing 14, which may generally shield various internal components of baler 12. As baler 12 moves across a field (e.g., as towed by vehicle 10 via connection 10a) and encounters a windrow or other arrangement of material (not shown), pick-up assembly 16 may gather the material and move it up and into housing 14 for processing. As a result of this processing, as described in greater detail below, bale 18 may be formed and may be ejected from the rear of baler 12.

In various embodiments, baler 12 (or vehicle 10) may include one or more computing devices, such as controller 34. Various alternative locations for controller 34 are depicted in FIG. 1A, including locations on vehicle 10 and baler 12. It will be understood that one or more controllers 34 may be employed and that controller 34 may be mounted at various locations on vehicle 10, baler 12, or elsewhere. Controller 34 may be a hardware, software, or hardware and software computing device, and may be configured to execute various computational and control functionality with respect to baler 12 (or vehicle 10). As such, controller 34 may be in electronic or other communication with various components and devices of baler 12 (or vehicle 10). For example, controller 34 within baler 12 may be in electronic communication with various actuators, sensors, and other devices within (or outside of) baler 12. Controller 34 may communicate with various other components (including other controllers) in various known ways, including wirelessly. The baler 12 and related embodiments thereto are further described in U.S. Patent Application Publication No. 2015/0208586, titled Baler Plunger-Position Sensor Assembly and Method, the disclosure of which is hereby incorporated by reference.

Figure 1B:
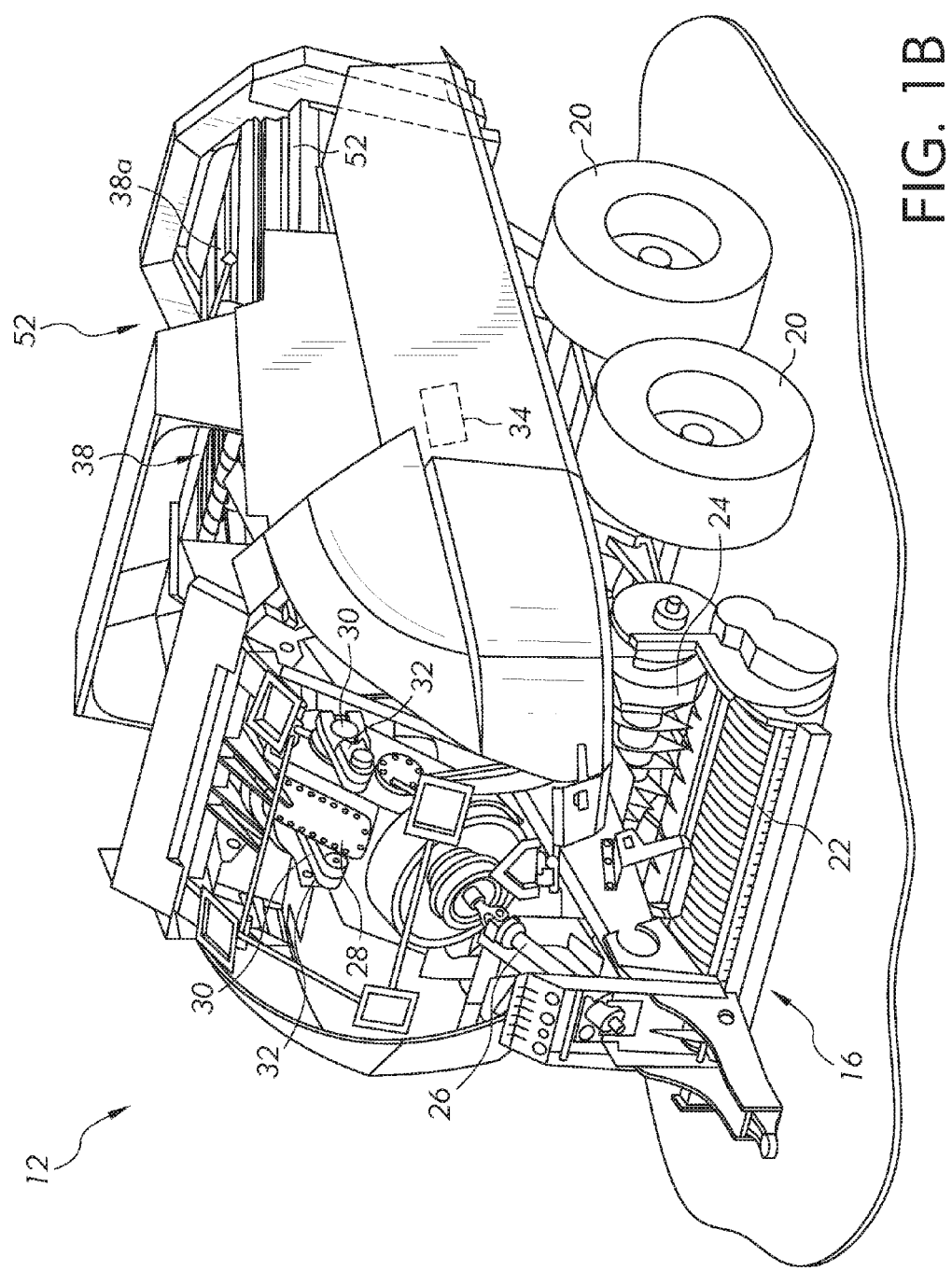
FIG. 1B is a perspective view of the baler of FIG. 1, with portions of the cover of the baler removed.

Referring now also to FIG. 1B, various internal components of an example configuration of baler 12 are depicted. It will be understood that various other configurations may also be possible. Pick-up assembly 16, for example, may include rotary tine pick-up 22 for gathering crop material from a windrow (not shown). Material gathered by rotary tine pick-up 22 may be routed to feed auger 24, which may further direct the material toward baling chamber 38 for compaction into a baler.

Baling chamber 38, which is depicted with upper panel 38a in place, may be a chamber of generally rectangular cross section extending axially along baler 12 in a generally front-to-back direction. Chamber 38 may be configured in various ways to receive material gathered by pick-up assembly 16, hold the material for compaction, then release the resulting bale from the back (or other portion) of baler 12 (e.g., as depicted for bale 18, in FIG. 1A).

Baling chamber 38 may be bounded on one or more sides (e.g., to the right and left, from the perspective of the forward direction of baler 12) by tension panels 52, which may be movable in order to control various aspects of a baling operation. For example, various actuators (not shown) may be mounted to baler 12 and one or more of tension panels 52 such that the actuators may cause tension panels 52 to vary the cross-sectional area of baling chamber 38. In certain embodiments, for example, hydraulic pistons (not shown) may be configured to pivot tension panels 52 into (or out of) baling chamber 38, in order to decrease (or increase) the cross-sectional area of chamber 38 and thereby increase (or decrease) the force required to push a given amount of compacted crop material through chamber 38 (e.g., the pressure required for plunger 54 to move the bale through chamber 38). In this way, for example, tension panels 52 may be utilized to vary the density of the resulting bale 18.

Compaction of crop material within baling chamber 38 may be driven in various ways. For example, as depicted in the various figures, a plunger (not shown in FIG. 1B) may be driven by a crank arm assembly. As depicted in FIG. 1B, power take off ("PTO") connection shaft 26 may be configured to receive rotational power from PTO shaft of vehicle 10 (e.g., via connection 10a, as shown in FIG. 1A). In certain embodiments, accordingly, whenever the PTO output of vehicle 10 is engaged, PTO connection shaft 26 may be receiving rotational power from vehicle 10. (It will be understood that various other configurations are also possible, such as configurations in which shaft 26 (or various other components of baler 12) may be selectively disengaged even if the PTO output of vehicle 10 is engaged.)

In various embodiments, PTO connection shaft 26 may provide rotational power to gear box 28. Through one or more internal gears (not shown in FIG. 1B), this power may be routed through gear box 28 to crank arms 30, which may be connected to plunger 54 via connecting rod(s) 32. (Connecting rods 32 have been partially removed in FIG. 1B, for clarity of presentation.) In this way, rotational power may be provided from vehicle 10 to crank arms 30. Crank arms 30, accordingly, may then drive the reciprocating motion of the plunger, via connecting rod(s) 32, in order to compact material within baling chamber 38 into formed bales 18. It will be understood that various other configurations may be possible. For example, in certain embodiments, gear box 28 may be powered by an electrical or hydraulic machine rather than by direct mechanical power from a PTO interface.

In various embodiments, rotation of PTO connection shaft 26 (e.g., as powered by the PTO output of vehicle 10) may additionally (or alternatively) provide rotational power to various components of baler 12. For example, the motion of various components of pick-up assembly 16, various tying mechanisms (not shown), pumps for hydraulic actuation of tension panels 38 (not shown), and so on, may be driven via power connections of various known types (e.g., chain or belt drives) to PTO connection shaft 26 or associated components.

A twine tying arrangement (not shown) may be provided for wrapping and tying multiple loops of twine about a completed bale. The bale tying cycle may be initiated by a bale length sensor arrangement (not shown) including a toothed metering wheel (not shown) mounted on a shaft (not shown) extending horizontally across and being rotatably mounted to the top of the baling chamber 38. The metering wheel may have a toothed periphery which extends into the baling chamber 38 and is contacted by a forming bale so as to be rotated as the bale grows in length. The rotation of the metering wheel is sensed and converted into a signal representing bale length, with a control signal being sent to initiate the tying cycle when the forming bale reaches a length corresponding to a desired bale length. An example of a twine tensioner or knotter system is described in U.S. Pat. No. 8,617,834 to Deere & Company, the disclosure of which is hereby incorporated by reference.

While a large square baler is described in FIGS. 1A and 1B, the present disclosure is not limited to large square balers, but includes round balers such as those found in U.S. Pat. Nos. 6,622,468, 6,640,699, 7,694,504, the disclosures of which are incorporated by reference herein. The round baler does not include a compression chamber as does the large square baler. The present disclosure, however, in not limited to a baler of a particular type, and is applicable to balers of different types including those having a precompression chamber, no precompression chamber, secondary rotors, or those having crop moving directly into a formation chamber. The present disclosure is also not limited to balers but can also include other harvesting machines or crop processing machines such as chopping systems used on combines.

Figure 2:
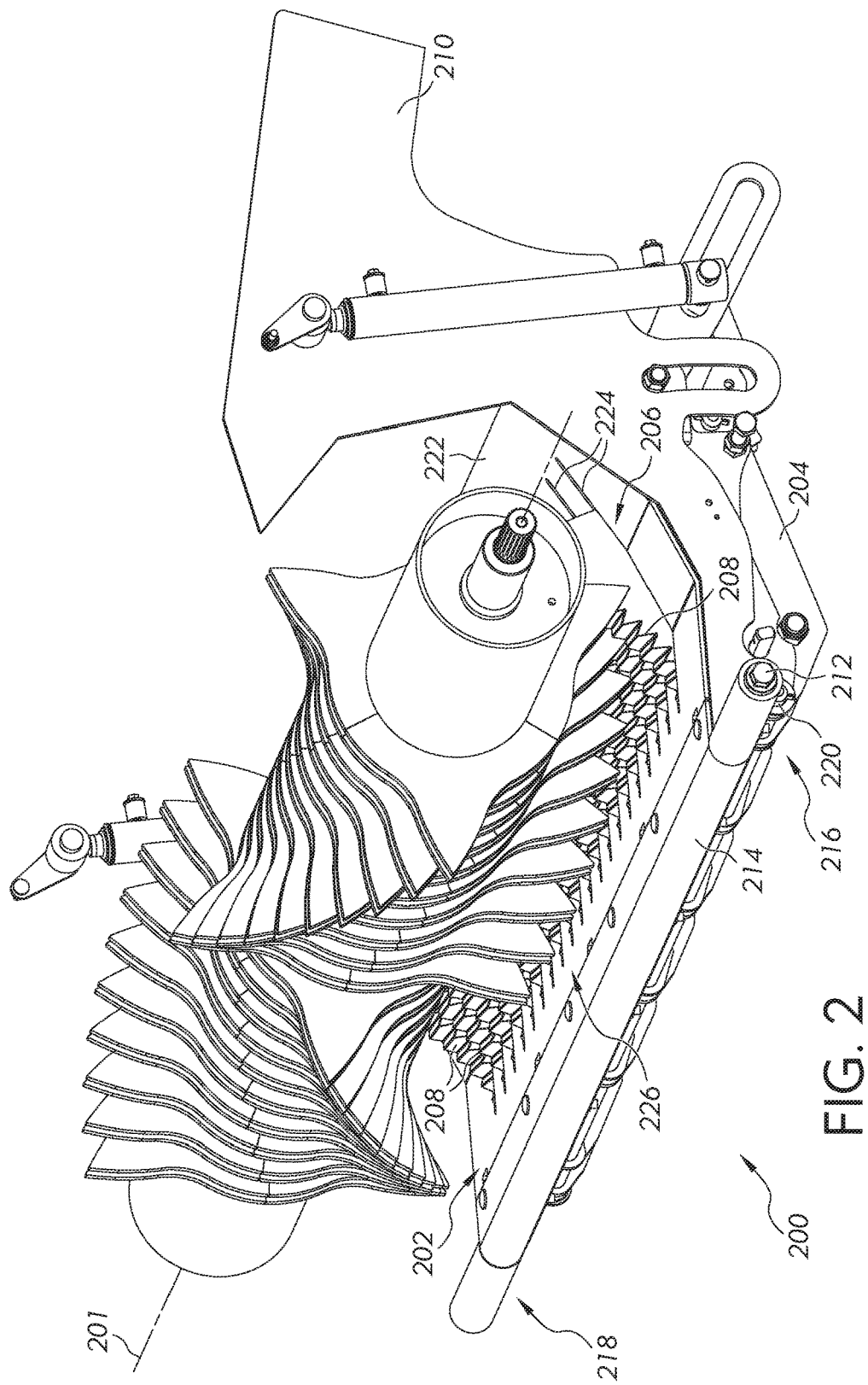
FIG. 2 is a front perspective view of the knife system assembly.

FIG. 2 illustrates a front perspective view of a secondary feeder system 200. Once the crop is picked up by the pick-up mechanism, the crop moves to the secondary feeder system 200 which includes a rotor assembly having a rotation axis 201 disposed above a knife system assembly including a top frame assembly 202 which is disposed above a bottom frame assembly 204. The bottom frame assembly 204 includes a knife support system 206 which supports a plurality of knives 208 configured to cut the crop passing into and through the rotor assembly. A baler frame 210 supports the top frame assembly 202 as well as the bottom frame assembly 204. The rotor assembly includes a plurality of teeth or tines and the plurality of knives 208 extend into spaces located between the teeth or tines to cut crop.

The top frame assembly 202 is pivotably coupled to the frame 210 at a pivot 212. The pivot 212 includes a shaft 214 supported by the baler frame 210 at a first end 216 and a second end 218. The bottom frame assembly 204 is pivotably coupled to the top frame assembly 202 at a pivot 220 which includes a shaft extending from one side to the other side of the top frame assembly 202.

While the pivot 212 is used to movably couple the top frame assembly to the baler frame 210, other mechanisms of relative movement between the two are included. For instance, a spatial mechanism, which movably spaces the baler frame and the top frame are included. In one embodiment, the spatial mechanism is the planar mechanism. In another embodiment, a four bar linkage is operatively connected to the baler frame and to the top frame.

While the pivot 220 is used to movably couple the bottom frame assembly to the top frame assembly, other mechanisms of relative movement between the two are included. For instance, a spatial mechanism, which movably spaces the top frame and the bottom frame are included. In one embodiment, the spatial mechanism is the planar mechanism. In another embodiment, a four bar linkage is operatively connected to the top frame and to the bottom frame.

A sheet 222, of the top frame assembly 202 includes a plurality of slots 224 configured such that the plurality of knives 208 extends through the sheet into a crop passageway 226. In one embodiment, a single knife 208 extends through a single slot 224. The knives 208 extend through the slots 224 to cut crop which moves over the surface of the sheet 222. Once the crop has been cut, the material continues over the sheet 222 and, in one embodiment, moves subsequently to a pre-compression chamber before continuing to a baling chamber. In another embodiment the cut crop moves over sheet 222 to a secondary rotor or directly into a bale chamber.

While the embodiment is described as the top frame 202 being coupled to the baler frame 210 and the bottom frame 204 coupled to the top frame 202, alternative embodiments are possible, such as the bottom frame 204 being coupled to the baler frame 210 and top frame 202 being coupled to the bottom frame 204. In another embodiment, the top frame 202 and bottom frame 204 may both be coupled to the baler frame 210.

In the embodiment described below, the knife system includes a knife protection mechanism comprising a roller, spring, and movable members. The knife protection system is coupled to the bottom frame. Other embodiments may not include a knife protection system to limit complexity. These alternative embodiments without a knife protection system are vulnerable to knife damage from an overload occurring during operation such as a foreign object entering into the baler and being forced against a knife.

In one embodiment, the knives 208 are coupled to the top frame at pivot 236 and are also supported by the knife support system 206. Each of the knives 208 is pushed through a respective slot 224 by a roller being forced against a ramp or cam shape that is integrated into the knife shape to push the knife through sheet 222 into the crop passageway. This will be referred to as the engaging force that is applied to a knife to move it to an operative position. Each of the knives 208 are biased to the cutting position by an associated spring. The knife moves through sheet 222 until the roller enters into a depression or notch in the knife that holds the knife in the raised position. This position will be referred to as the operative position of the knife. The notch is configured such that a relatively high force is necessary to move the spring loaded roller out of the notch to allow the knife to move out of the crop passageway in the case of hitting a foreign object. The retracted position may also be referred to as the protected position. The location of the pivot 220 with respect to the top frame assembly 202 is determined such that the spring length does not shorten excessively during operation, so that there is sufficient force to engage the knife with the roller in the notch and also for consideration to make sure the spring does not become unhooked. In still other embodiments, the baler does not include a roller and a spring. Other embodiments may include alternative mechanical members to provide the engaging force such as an actuator or compressive member.

To remove the knives for service or replacement, an actuator (not shown and as known by those skilled in the art) applies force to the knife support system 206 to move the supporting members, in this embodiment the roller, away from the knife such that the roller is moved out of the notch of the knife. This allows the knife to freely pivot about pivot shaft 236. Shaft 236 can then be rotated to a service position so that the knives can be removed from the shaft by an operator. After service, cleaning or replacement is complete, shaft 236 can be rotated back to the operative position and the actuator can be operatively moved so that the roller is again forced against the knife to lock the roller into the notch. In alternative embodiments, other mechanical systems may be used to provide force to the knife support system to move the members to unlock the knives such as a lever arm, mechanical motor, electric actuator or combination of linkages able to provide force or rotational torque.

It is sometimes desirable for an operator to harvest crop and partially or minimally cut the harvested crop. In this case, the operator can move the knives to a retracted or protected position such that the rotor assembly may move crop across the sheet 222 of the top frame assembly with the knives 208 still extending partially through the sheet 222. The knives 208 can be lowered to the retracted position to partially or minimally cut the harvested crop. Alternatively, the knives 208 can be completely removed from the baler 12 to harvest crop without cutting it. Further, the knives can be replaced with a sheet acting to at least partially close the open slots 224 to prevent crop from passing through the open slots 224.

The knives 208 may be coupled to the top frame and to the knife protection system. In different embodiments, the knives 208 are attached completely to one of the top frame, the bottom frame, and the knife protection system or are coupled to a different combination of frames at respective attachment locations. In one embodiment, the knife system is coupled partially to the top frame and partially to the bottom frame.

Figure 3:
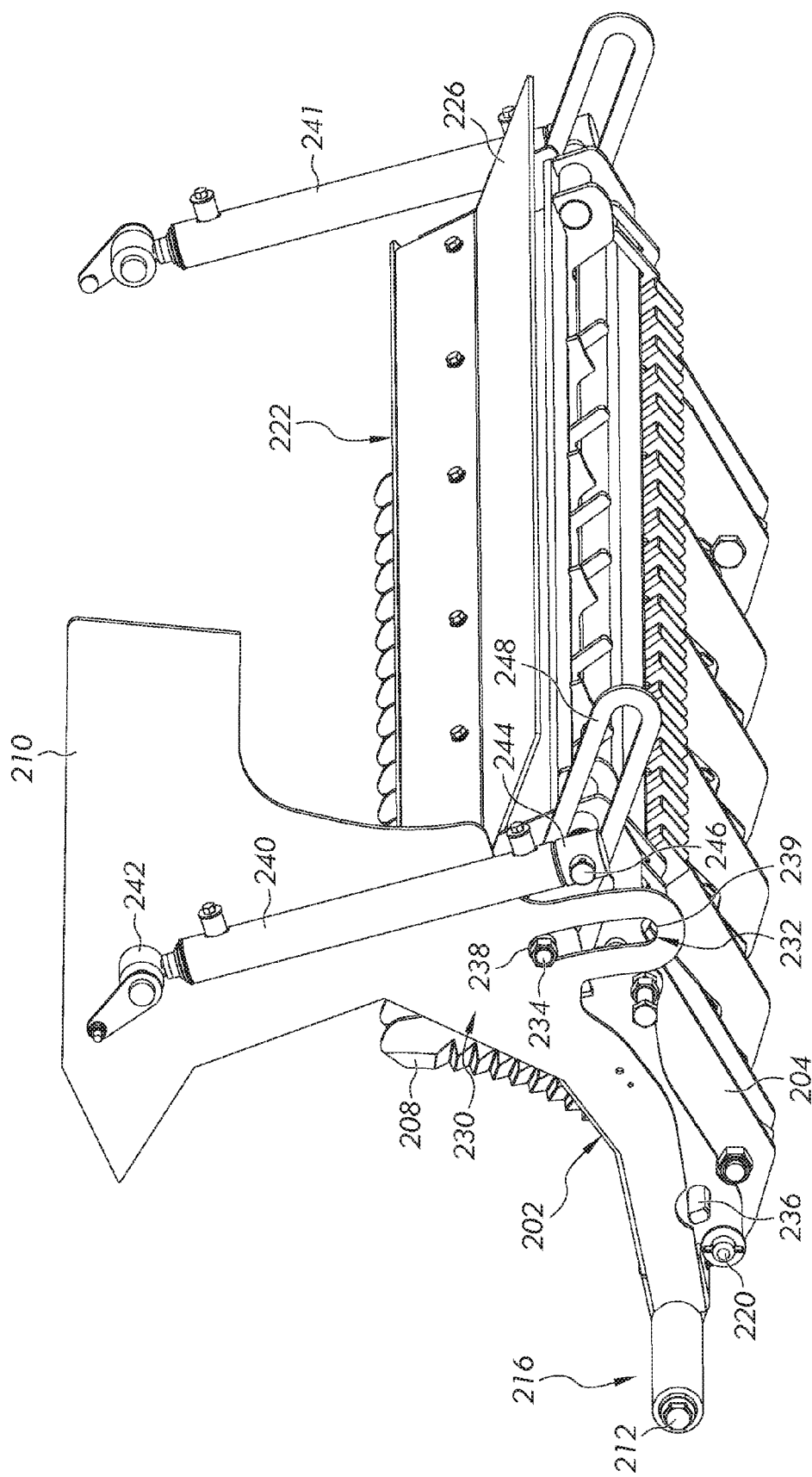
FIG. 3 is a rear perspective view of the knife system assembly of FIG. 2 having a top frame assembly disposed adjacently to a bottom frame assembly.

FIG. 3 illustrates a rear perspective view of the secondary feeder system 200 illustrating a limit stop assembly 230 configured to determine the extent of travel of one, some of, or all of the feeder assembly 200, the top frame assembly 202, the bottom frame assembly 204, and the knife support system 206. The limit stop assembly 230, in the illustrated embodiment, includes a portion of the frame 210 having a slot 232 defined therein. A pin 234 extends from the top frame assembly 202 and into the slot 232. As the top frame assembly 202 pivots about the pivot 212, movement of the top frame assembly 202 is limited by a first end 238 and a second end 239 of the slot 232. In another embodiment, the limit stop assembly 230 is not located in the frame 210. Instead, a slotted bar (not shown) similar to the slotted bar 248 described below, is attached to the frame of the baler. One end is pivotably located at the baler frame and ends of the slot disposed in the slotted bar provide stops to limit movement of the top frame assembly. In one embodiment, the limit stop assembly 230 is located on only one side of the frame assembly 202. In another embodiment, the limit stop assembly 230 is located on both sides. In another embodiment the limit stop may be replaced with an actuator that limits the movement of the top frame by a closed and open length of the actuator.

In an operative cutting position, both the top frame assembly 202 and the bottom frame assembly 204 are adjacently located to place the plurality of knives 208 through the plurality of slots 224. This can be considered as a first position. In addition, the combination of the adjacently disposed top frame assembly 202 and bottom frame assembly 204 is located at a first position as illustrated in FIG. 3 wherein the pin 234 is located at the first end 238.

Figure 4:
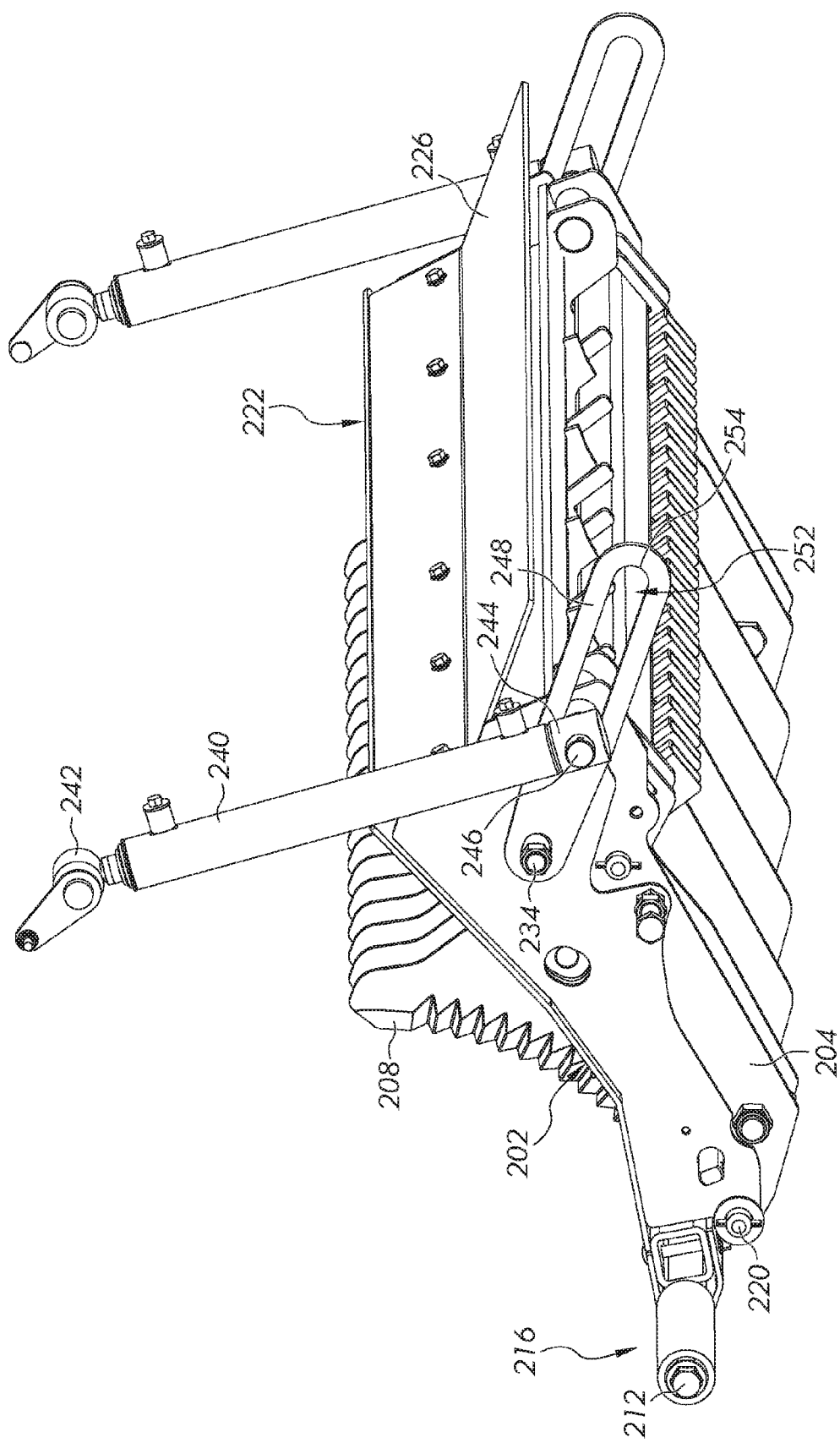
FIG. 4 is rear perspective view of the knife system assembly of FIG. 2 having a top assembly disposed adjacently to a bottom frame assembly.

An actuator 240 is pivotably coupled at a first end 242 to the frame 210 and at a second end 244 to a pin 246 extending from the bottom frame assembly 204. A second actuator 241 is located at the other end of the bottom frame assembly 204. The actuators, in one embodiment, are each a hydraulic cylinder which extend from a retracted position. In the retracted position, the actuator 240 locates the pin 234 at the first end 238 of the slot by pulling up on the bottom frame assembly 204 until the pin 234 is stopped by contact with the first end 238. The pin 246 further engages a slotted bar 248 which is located between the actuator 244 and a side of the bottom frame portion 204. The slotted bar 248 is freely pivotable about a pin 234 as further illustrated in FIG. 4. In another embodiment, instead of using hydraulic cylinders to raise/lower the system and the other frame members, an electric actuator is provided. In another embodiment, a derivative type of a hydraulic system is provided with a hydraulic motor and linkages. Also a derivative of an electric motor and linkages are used in other embodiments. The present disclosure is not, however, limited to two cylinders, but one or more cylinders are possible.

When an operator intends to lower the knives 208, lower the floor for unplugging, or lower the floor for other reasons, from the illustrated cutting position, the actuators are extended to move both the top frame assembly 202 and the bottom frame assembly 204 at the same time. In other embodiments, the top frame assembly 202 and the bottom frame assembly 204 do not necessarily move at the same time, as the different assemblies can be constrained to move in different sequences.

In one embodiment, during this movement, the weight of the top frame assembly 202 keeps the top frame assembly 202 in close proximity with the bottom frame assembly 204. The pin 234 moves along the slot 232, which is curved to accommodate the pivoting of both the top frame assembly 202 and the bottom frame assembly 204 about the pivot 212. Once the pin 238 engages the second end 239, further movement of the top frame assembly 202 is prevented. This position is an intermediate location in which the knives 208 are no longer in the full cutting position, but are spaced from the cutting position such that access to the rotor assembly is made possible for clearing of plugs, debris, maintenance, or repair. In this position, the top frame assembly 202 is spaced from the rotor and the knives 208 still at least partially extend from the slots 224.

If it is desired to move the knives 208 further away from the rotor, the actuators are further extended to move the bottom frame assembly 204 away from the top frame assembly 202 which is now located at a fixed position at the intermediate location, which can be considered as a second position. In the second position, the knives 208 can still cut crop, but are displaced from the rotor at this position to enable unplugging of the feed system. The top frame is also lowered to reduce any restrictions resulting in a plugged crop. The second position is established at a predetermined position which sufficiently displaces the top frame from the rotor to enable unplugging of the rotor, but still provide sufficient ground clearance for maintenance or for moving the baler.

Figure 5:
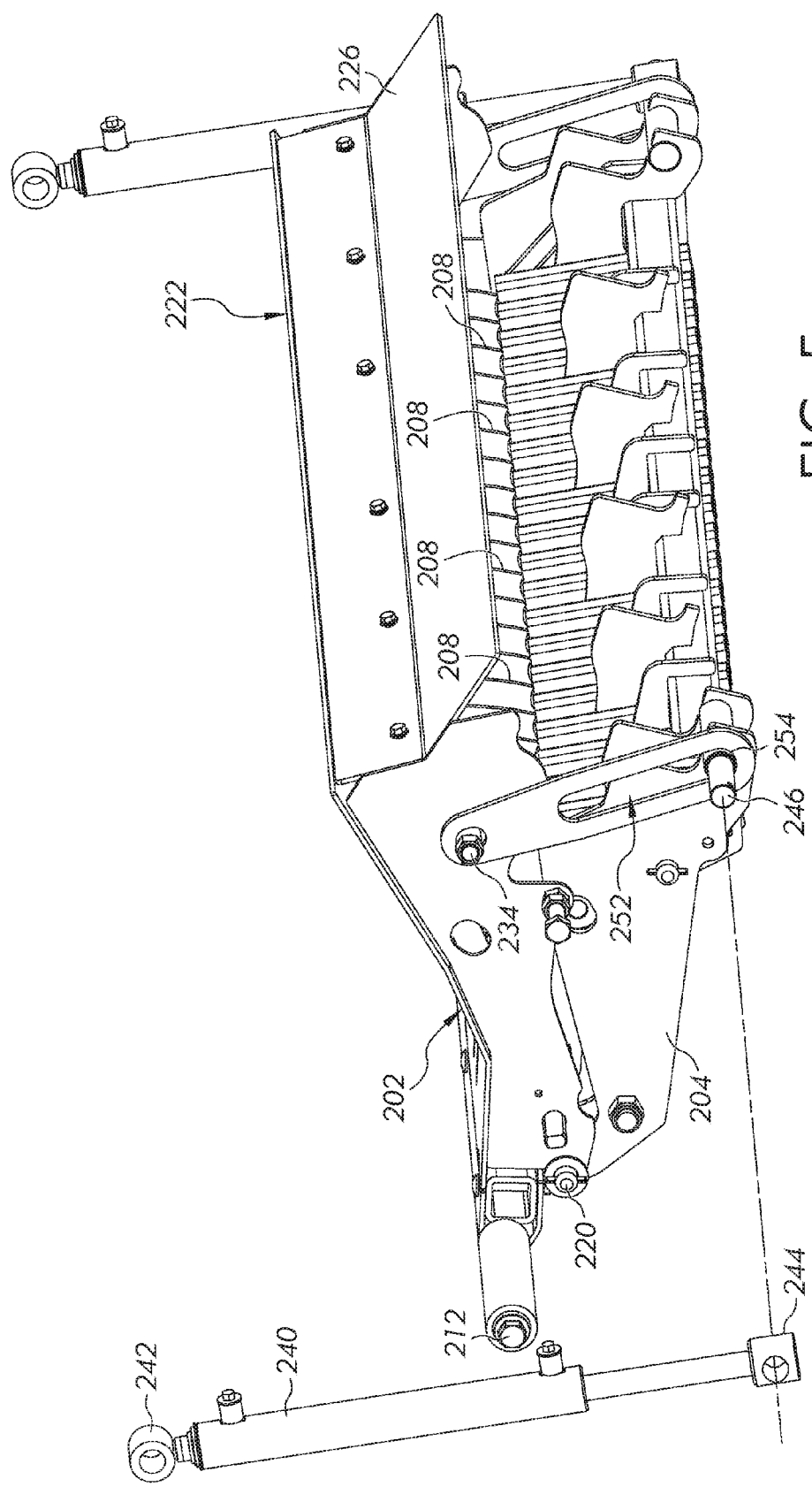
FIG. 5 is rear perspective view of the knife system assembly of FIG. 2 having a bottom frame assembly spaced from a top frame assembly.

As the actuator 240 is extended, the pin 246 moves along a slot 252 of the slotted bar 248 which rotates responsively about the pin 234 to accommodate movement of the bottom frame portion 204 to a third position, to retract the majority of the knives 208 from the slots 224. Movement of the bottom portion 204 is stopped at the third location by an end stop 254 defined by the slot 252 as illustrated in FIG. 5. Once the pin 246 contacts the end stop 254, further movement of the bottom frame portion 204 is prevented. This can be considered as a third position. At the third position, additional clearance is provided from the rotor for unplugging of the rotor by reducing the height of the knives with respect to the surface of the top frame. The knives extend at least partially through the slots 224 in this position to enable removal of the knives for service. In another embodiment, more than one set of actuators may be used, for example one set to control the movement and limiting positions of the top frame and another set of actuators may be used to control the movement and limiting positions of the bottom frame.

In the event a knife becomes stuck in an inoperative position during normal harvesting conditions such as a knife that is moved to a protected position after being impacted by a foreign object and becomes stuck in this position due to crop buildup providing enough resistance to overcome the engaging force, the knife can be re-set through the operative sequence described above. When in the third position, each of the plurality of knives is forced to re-set from a possible protected or inoperative position to an operative position. This requires movement to the third position, and then returning to the first position for a normal cutting operation. The forced resetting of knives is robust due to the roller of the knife supporting mechanism being moved to align with the notch of the stuck knife and not only relying on the engaging force of the spring loaded mechanism. The range of motion of the second frame is defined such that the range of motion of the roller encompasses the entire range of possible locations of the notch of a knife in any position it may be stuck. This enables an operator to reset the knives without exiting a cab of the vehicle. The ability to re-set knives automatically to the operating position from operator station improves productivity.

As seen in FIG. 5, the bottom frame assembly 204 is spaced from the top frame assembly 202 such that the knives 208 extend sufficiently to extract for service when unlocked. In this position, the knives 208 are exposed in a space located between the top frame assembly 202 and the bottom frame assembly 204. Debris located at the knives 208 is removed at this position of the bottom frame assembly 204 at least partially due to the movement of the frames. Further removal of debris is possible with compressed air.

Once the top frame assembly 202 and/or the bottom frame assembly 204 have been maintained, the blockage has been cleared, repaired or adjusted for further operations, the actuator 240 is retracted from the position illustrated in FIG. 5 to the position illustrated in FIG. 3. During movement of the actuator 240 from the fully extended position to the fully retracted position, the knives 208 are moved back through the slots 224 to further extend upward from the surface of the floor 222 and the top frame 202 is in an operative position. In this position, cutting of crop can be started or resumed. When the actuator 240 is in the fully extended position, the knives 208 are in a lowered or retracted position with at least a portion of the knives 208 still extending up through the slots 224. When the actuator 240 is in the fully retracted position, the knives 208 are in a raised or extended position with the knives 208 fully extending up through the slots 224.

Figure 6:
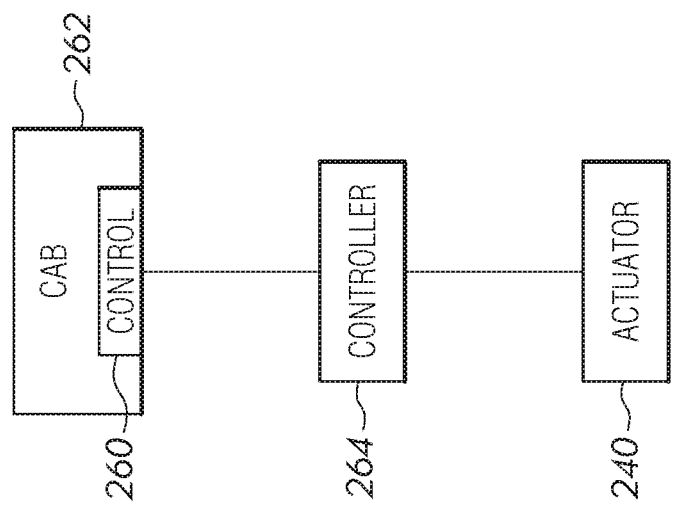
FIG. 6 is a schematic block diagram of a control system configured to operate the disclosed system.

As illustrated in FIG. 6, the actuator 240 is controlled with an operator control 260 located in a cab 262 of the baler 12 or in a cab of a tractor 10 or other vehicle pulling the baler 100. The control 260 is coupled to a controller 264, which includes a processor, configured to adjust the actuator 240 and therefore the locations of the top frame assembly 202, the bottom frame assembly 204, and the plurality of knives 208. Thus, an operator of the baler controls movement of the feeder assembly 200, between a raised and a lowered position. Since the knife system is coupled to the bottom floor assembly 204, the knife system also moves with the bottom floor assembly 204 between the raised and lowered positions with only one input from the operator.

The control aspects of this disclosure have been briefly described throughout. An operator is positioned in the cab 262 during operation. In this embodiment, the operator control 260 is located in the cab 262. In another embodiment, the operator control 260 is located externally of the cab, and in one embodiment is located at the baler. While one operator control 260 is shown, the cab 262, in other embodiments includes additional controls, but this embodiment is only intended as a simplified example. Each of the controls may be manually controlled by the operator to control different functions or operations of the baler 12.

The control 260 is electrically operatively connected to the controller 264. The controller 264 may be coupled to the baler 12 in any conventional manner. The controller 264 is electrically operatively connected to the actuator 240 for transmitting signals to various components or mechanisms to control the operation of the baler 12. In one embodiment, the operative connections are made by wired connections. In other embodiments, the operative connections are made by wireless connections.

In one embodiment, the operator control 260 is a joystick which moves the feeder assembly 200 through every position, all in a single operator action without having to switch between multiple operator controls. For instance, a forward movement of the operator control 260, while configured as a joystick, moves both the top frame assembly 202 and the bottom frame assembly 204 from the topmost position illustrated in FIG. 3, through an intermediate position where movement the top frame assembly 202 has been stopped by engagement with the stop 239, and to a bottommost position where the bottom frame assembly 204 is spaced from the top frame assembly as illustrated in FIG. 5. As described herein, this single movement of the operator control 260 also moves the knife system with the top frame assembly 204 and eventually separates the knives 208 from the top frame assembly in the location shown in FIG. 5. Once the bottom frame assembly 204 has reached its bottommost position of FIG. 5, rearward movement of the joystick from its forward position, moves the bottom frame assembly 204 upwardly, moves the knives 208 back through the slots 224 of the top frame assembly 202, and lastly moves the both the top frame assembly 202 and the bottom frame assembly 204 to the topmost position of FIG. 3. Two separate actions are no longer required to lower the floor and lower the knives. In other embodiments, the operator control 260 is a rocker control, a slider control, or a graphical user interface control providing bidirectional control of the actuators. The simplified operator control enables service, maintenance, repair and unplugging with a single action. In other embodiments, more than one user input is included to lower the top frame and the bottom frame. For instance, the motion of the top frame is separated from the motion of the bottom frame using separate actuators.

The top frame assembly 202 and the bottom frame assembly 204 are lowered from the topmost position with a single operator input. The operator control 260 provides a single control signal to the controller 264 which in turn adjusts the position of both the top frame assembly 202 and the bottom frame 204 with a single input signal. Due to this configuration, the knives are configured to be "reset" with a single operator input. This enables an operator to reset the knives without exiting a cab of the vehicle.

Figure 7:
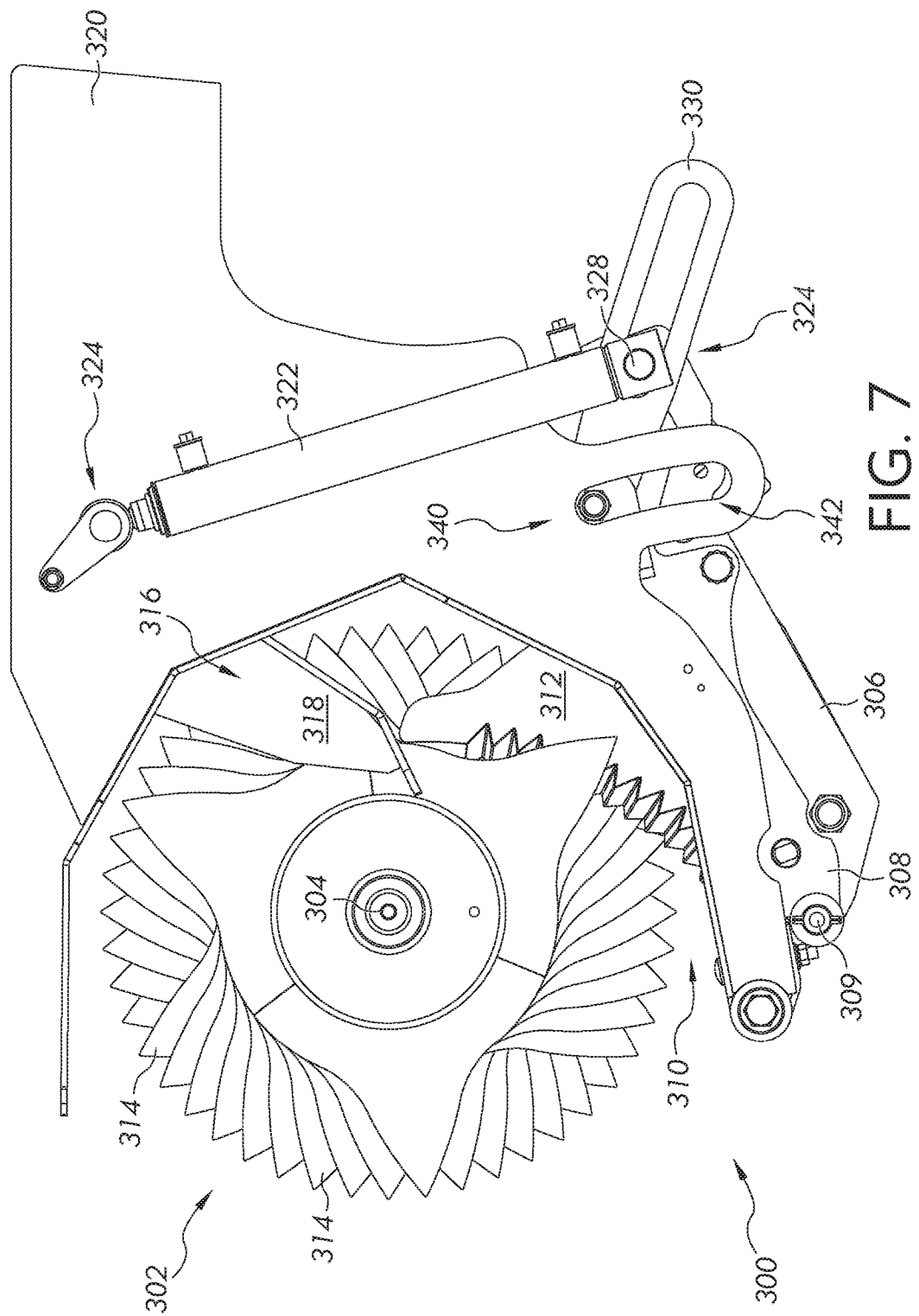
FIG. 7 is a side view of a floor assembly disposed adjacently to a rotor assembly and having a bottom frame assembly disposed in an up position and adjacently to a top frame assembly in an up position.

FIG. 7 illustrates a side view of a floor assembly 300 disposed adjacently to a rotor assembly 302 having an axis of rotation 304. A bottom frame assembly 306 is disposed in an up position next to a top frame assembly 308, also disposed in an up position. The bottom frame assembly 306 is pivotably coupled to the top frame assembly 308 at a pivot 309 which includes a shaft extending from one side to the other side of the top frame assembly 308. When both the top assembly 308 and the bottom assembly 306 are in the up position, a knife assembly 310, having a plurality of knives 312, is positioned to cut crop as it moves between the rotor assembly 302 and the knife assembly 310. To cut crop the rotor assembly 302 includes a plurality of blades 314 rotating in a counterclockwise direction as illustrated. A stripper assembly 316 is located adjacently to the rotor assembly 302 and includes a plurality of stripper blades 318, wherein one or more of the stripper blades 318 extend between blades 314 of the rotor assembly. The stripper blades 314 are adapted to clear or to remove cut crop from between the blades 314 which can reduce the effectives of the cut being made to the crop as it moves across the floor assembly 300.

A baler frame 320 supports one or both of the top frame assembly 308 and the bottom frame assembly 306, either directly or indirectly. An actuator 322 is pivotably coupled at a first end 324 to the frame 320 and at a second end 326 to a pin 328 extending from the bottom frame assembly 306. The pin 328 further engages a slotted bar 330 which is located between the actuator 322 and a side of the bottom assembly 306. The slotted bar 330 is freely pivotable about a pin as described herein.

A limit stop assembly 340 is configured to determine the extent of travel of the top frame assembly 308, the bottom frame assembly 306, and the knife system 310. The limit stop assembly 340, in the illustrated embodiment, includes a portion of the frame 320 having a slot 342 defined therein. The limit stop assembly 340 operates as previously described.

Figure 8:
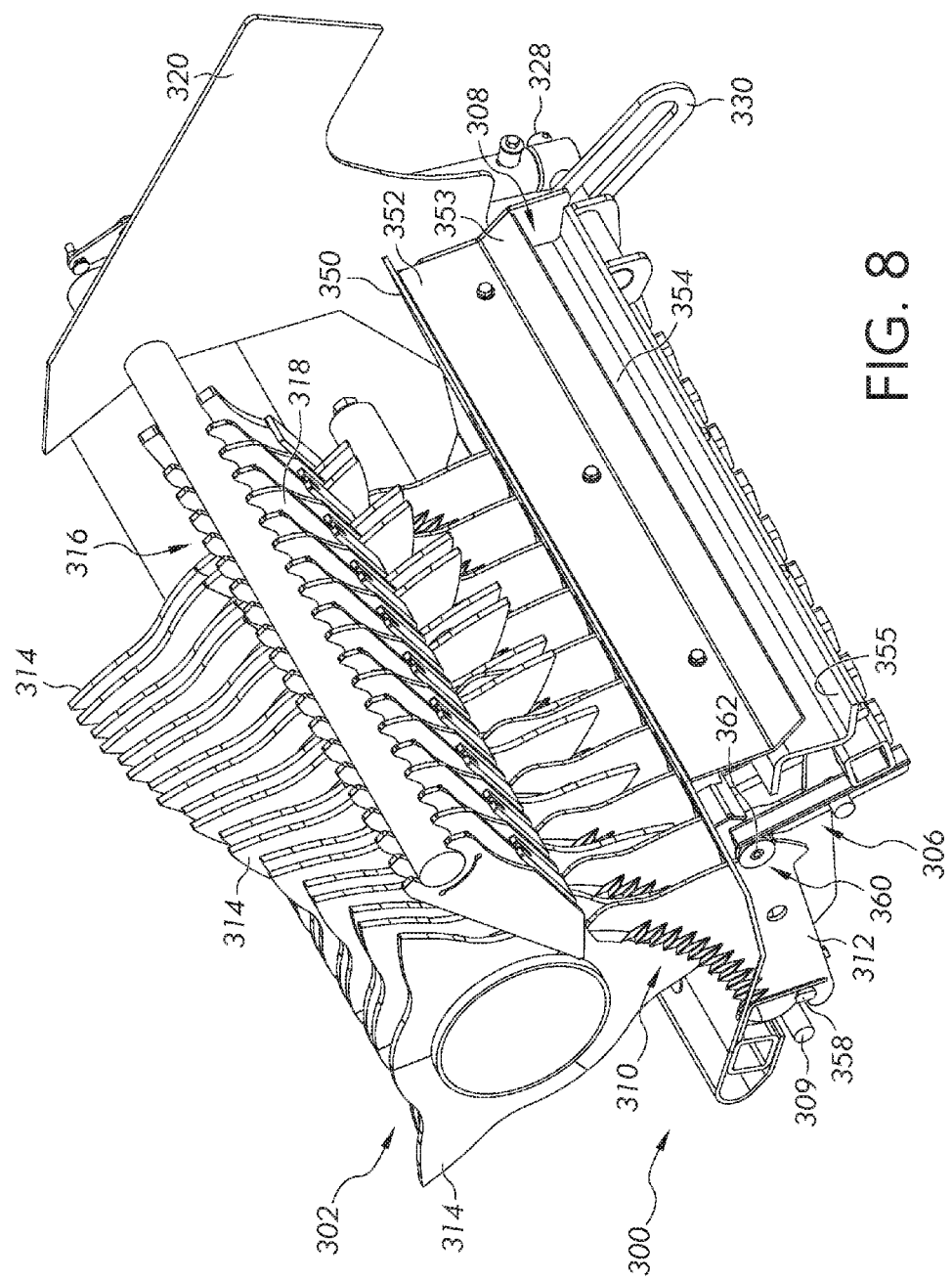
FIG. 8 is a sectional perspective view of a floor assembly of FIG. 7.

FIG. 8 illustrates a sectional perspective view of the floor assembly 300 of FIG. 7. As seen in FIG. 8, the sectional view taken along a midpoint of the assembly 300, such that approximately half of the assembly 300 is shown. The top frame assembly 308 includes a floor 350 upon which cut crops moves after being cut the plurality of knives 312. The floor 350 extends across a length of the top frame assembly 308. The top frame assembly 308 further includes a top frame component 352, including a lip 353. The top frame component 352 extends from the floor 350 and across a portion of the bottom frame assembly 306. The top frame 308, bottom frame 306, and knives 312 are all in their respective raised positions. The actuator 322 is fully retracted. The knives are in a locked condition with each roller 362 being positioned in a notch or indentation in a lower portion of a non-cutting edge of the knife. This is considered to be a position 1.

The bottom frame assembly 306 includes a bottom frame component 354, including a lip 355. The bottom frame component 354 extends across a length of the bottom frame assembly 306. In the illustrated position, the bottom frame component 354 nests within the top frame component 352 to substantially prevent cut crop from moving back into either the top frame assembly 308 or the bottom frame assembly 306 after being cut.

The knife assembly 310 is coupled to both the top frame assembly 308 and the bottom frame assembly 306. In particular, a forward end of each of the knives 312 are operatively connected to a shaft 358 which extends along the length of the knife assembly 310. Each of the forward ends of the knives 312 pivot about the shaft with movement of the bottom frame assembly 306 with respect to the top frame assembly 308. The knives 312 are also each individually pivotable about the shaft 358 under sufficient impact by crop or other debris.

Figure 9:
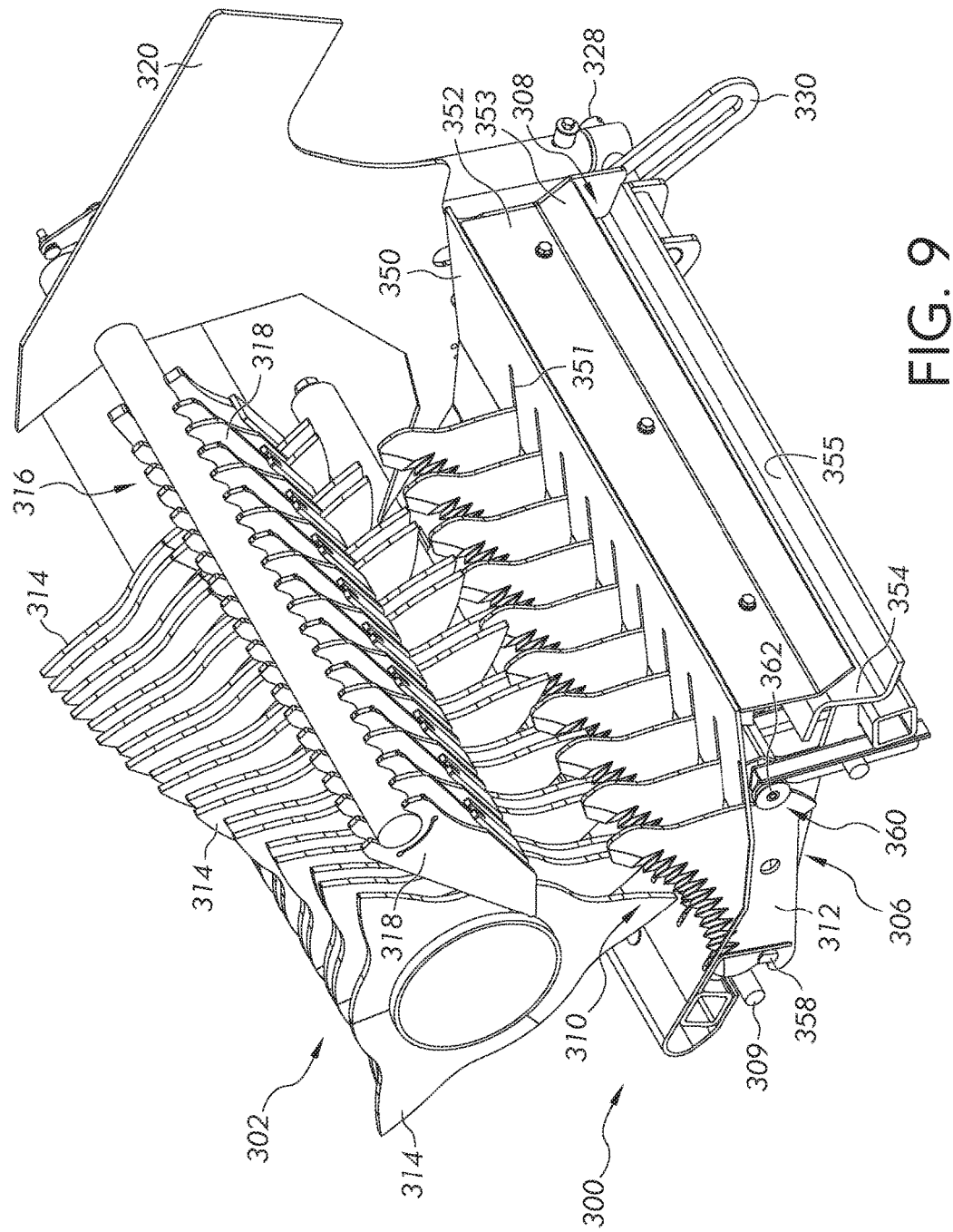
FIG. 9 is a sectional perspective view of the floor assembly of FIG. 7 having the top frame assembly disposed in a down position and the bottom frame assembly disposed in an up position.

Each of the rearward ends of the knives 312 are operatively connected to the bottom frame assembly 306 at a notch 360 which engages a roller 362. Each of the rollers 362 is coupled to a spring (not shown) which maintains a force sufficient to hold the knives in a cutting position. When a knife, experiences a sufficient impact, the roller 362 is displaced from the notch 360 and the knife 312 rotates about the shaft 358 to prevent the knife from being damaged or broken from the impact. As previously described, when the operator moves the bottom frame assembly 306 away from the rotor assembly 302 using the operator control 260, the bottom frame assembly 306 moves in a downward position as illustrated in FIG. 9. In this intermediate position, the top frame assembly 308 has moved down with the bottom frame assembly 306, which has moved away from the rotor assembly 302 by extension of the actuator 322. The pin 328 of the actuator 322 is located at a top location of the slotted bar 330. The bottom frame assembly 308 has moved under the force of gravity with movement of the bottom frame assembly 306. The notches 360 of the knives 312 are still engaged with the rollers 362. The knives 312 have at least partially moved away from the rotor assembly 302. In this position 2, the top and bottom frames are partially lowered together in an intermediate position with the bottom frame maintaining its position relative to the top frame. The knives are in their raised position. The actuator is partially extended (or partially retracted). The knives are in the locked condition.

Figure 10:
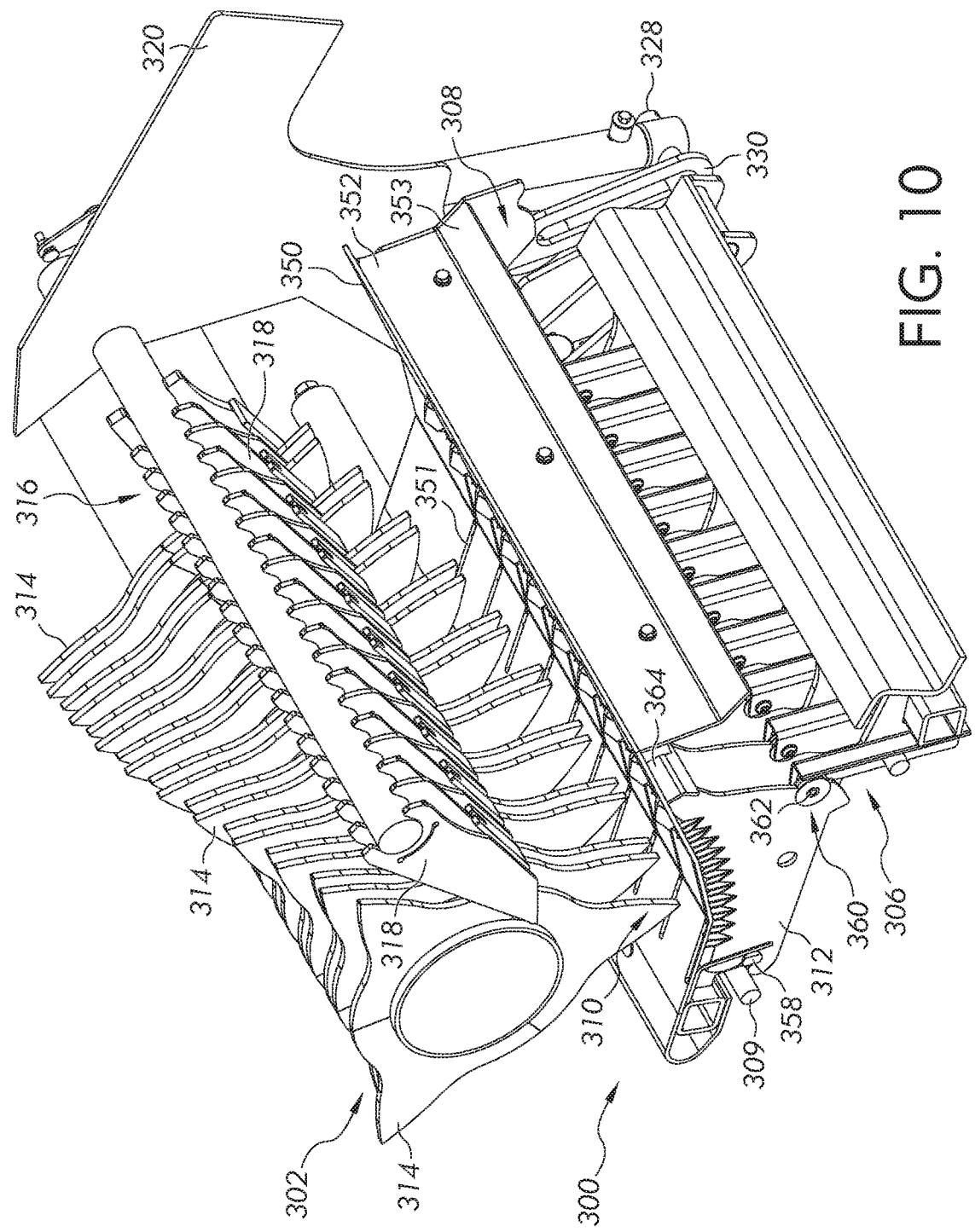
FIG. 10 is a sectional perspective view of the floor assembly of FIG. 7 having the bottom frame assembly disposed in a down position and the top frame assembly in an up position.

FIG. 10 illustrates the bottom frame assembly 306 disposed in a down position at the bottommost extent of the slotted bar 330. In this illustration, however, the top frame assembly 308 is separated from the bottom frame assembly 306. This respective condition between the top frame assembly 308 and bottom frame assembly 306 can occur due to frictional forces existing between the top frame assembly 308 and other components of the floor assembly 300. The knives 312 are separated from and do not extend substantially into the rotor assembly 302. The knives 312 have been retracted into the slots 351 of the floor 350. In this position, at least a portion of the knives 312 still extends up through the slots 351 of the floor 350. The top frame is in its raised position, the bottom frame is partially lowered (intermediate position), and the knives are in their lowered position due to the bottom frame lowering with relative to the top frame. The actuator is partially extended (or partially retracted). The knives are in the locked condition in this position 3.

Figure 11:
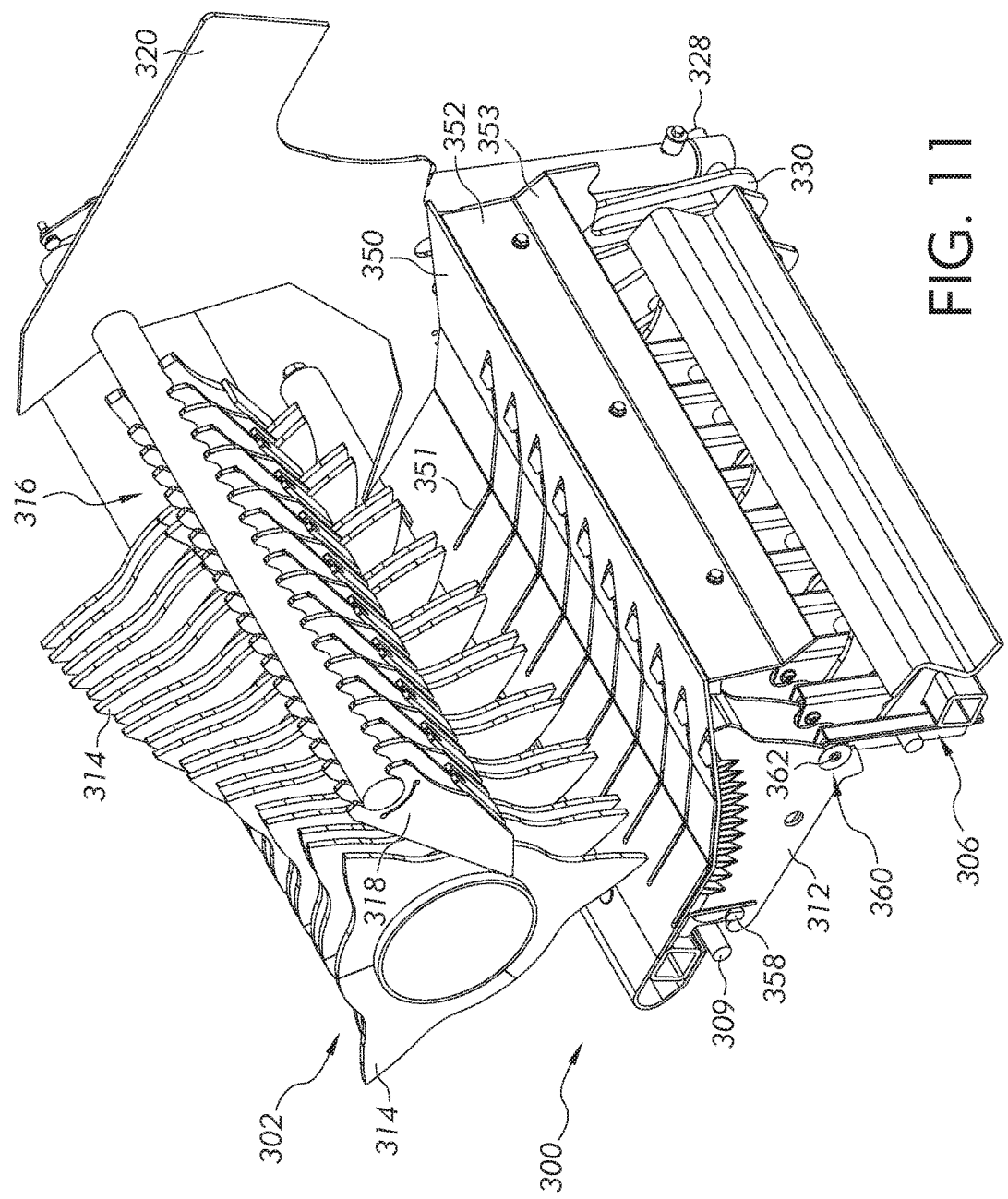
FIG. 11 is a sectional perspective view of the floor assembly of FIG. 7 having the top frame assembly disposed in a down position and the bottom frame assembly disposed in a down position.

Lastly, in FIG. 11, both the top frame assembly 308 and the bottom frame assembly 306 are located in a bottom most position where the knives 312 are fully retracted from the rotor 302 and into the slots 351 of the floor 350. As in FIG. 10, at least a portion of the knives 312 still extends up through the slots 351 of the floor 350. In this position, due to the length along the blades, between the shaft 358 and the notches 360, and a length between the pivot 309 and the rollers 362, a gap 370 is provided between the notches 360 and the roller 362. The appearance of this gap 370, which is also seen in FIG. 10, provides for removal, maintenance, or replacement of each of the knives 312 when desired or needed. In this position 4 of FIG. 11, the top frame, the bottom frame, and knives are all in their respective lowered positions. The actuator is fully extended and the knives are in the locked condition.

FIGS. 8-11 describe four positions of the floor assembly 300, according to one implementation. In FIG. 8, the top frame assembly 308, the bottom frame assembly 306, and the knives 312 are in their respective raised positions. In FIG. 9, the top frame assembly 308 is in its lowered position. The bottom frame assembly 306 maintained its position relative to the top frame assembly 308 and is in an intermediate position. The knives 312 are in the raised position relative to the top frame assembly 308, but have moved away from the rotor assembly 302 due to the top frame assembly 308 moving to its lowered position. In FIG. 10, the top frame assembly 308 is in its raised position, the bottom frame assembly is in its lowered position relative to the top frame assembly 308, and the knives 312 are in their lowered position relative to the top frame assembly 308. As stated above, at least a portion of the knives 312 extends through the slots 351 in the floor 350 when the knives 312 are in their lowered or retracted position. When in this position, further movement of the knives 312 is substantially prevented by contact with either a terminating end of the slot 351 or contact with a plate 364. The knives 312 move to their lowered position due to the interaction between the roller 362 of the bottom frame assembly 306 and the notch 360 in each of the knives 312. The roller 362 is positioned within the notch 360 of each knife 312, and the roller 362 moves downward with the bottom frame assembly 306 thus moving the knives 312 downward. In FIG. 11, the top frame assembly 308, the bottom frame assembly 306, and the knives 312 are all in their respective lowered positions. Even in this position, at least a portion of the knives 312 extends up through the slots 351 in the floor 350.

Figure 12:
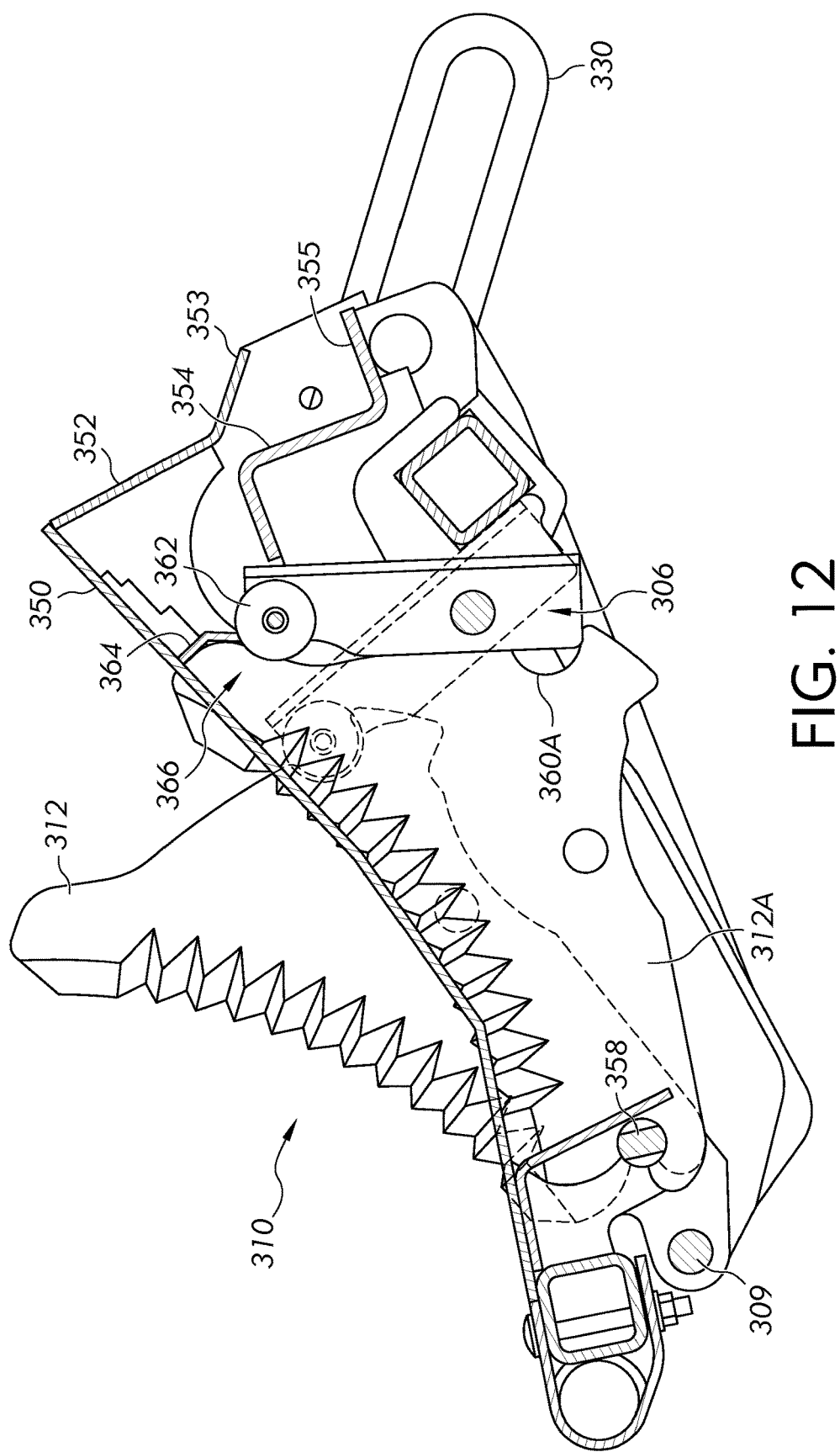
FIG. 12 illustrates a side view of a bottom frame assembly and a top frame assembly in a raised position.

FIG. 12 illustrates a side view of both the bottom frame assembly 306 and the top frame assembly 308 in the raised position. The actuator 322 is fully retracted. One of the knives 312A is in a tripped or unlocked position, such that the roller 362A has moved from the notch 360A to an upper portion 366 of the non-cutting edge of the knife 312A. In this position, the knife 312A has moved away from the rotor assembly 302. If the top frame 308, the bottom frame 306, and knives 312 are all in their respective raised positions (Position 1 of FIG. 8), and one or more of the knives are later tripped, the tripped knife or knives move to a lowered position, as shown in FIG. 12. The force against the cutting edge of the knife overcomes the force of the roller 362 which is located in the notch 360, to move the roller 362 out of the notch 360. The location of the roller 362 changes from a lower portion to an upper portion of the non-cutting edge of the tripped knife 312 as the knife 312 rotates away from the rotor assembly 302. To reset the one or more tripped knives, the actuator 322 is fully extended so that the top frame 308, bottom frame 306, and knives 312 are all in their respective lowered positions (Position 4 as seen in FIG. 11). The roller 362 returns to the notch 360 in the lower portion of the non-cutting edge of the knife as shown in FIG. 11. The actuator is then fully retracted and the top frame 308, bottom frame 306, and knives 312 return to their raised positions (Position 1) as shown in FIG. 8.

In one embodiment, respective movement of the top frame and the bottom frame is implemented though a first single actuator, such as actuator 240, located on one side of the secondary feeder system, 200, and a second single actuator, such as actuator 241, located on another side of the secondary feeder system 200. In this embodiment, each side is limited to using a single actuator. In another embodiment, only one of the actuators 240 or 241 is included in the secondary feeder system 200.

Conventionally, at least one pair of actuators is used to lower the floor and at least a second pair of actuators is required to unlock the knives and lower them relative to the frame. In this disclosure, however, it is shown and described that in at least one embodiment no more than two actuators are used for lowering the floor and unlocking the knives and lowering the knives relative to the frame. Alternatively, a single actuator may be used to control the lowering of the floor, unlocking the knives, and lowering the knives relative to the frame. In effect, this may simplify the overall design and improve reliability of the machine.

As described herein, the knives are attached to the top frame assembly and to the bottom frame assembly at the same time. The connection of the knives to both frame assemblies provides for the removal of each of the knives from the top and/or the rear of the machine. If the knives were instead attached only to a bottom frame assembly and the machine necessitated service from the rear (not slid laterally), the front portion of each of the knives will be harder to load due to being at a lower position relative to the floor when compared to when the knife is attached to the top frame assembly.

The described embodiments are also configured to couple the top frame assembly to the frame of a machine, such as the baler. By partially attaching the top frame assembly to the baler frame, the top frame assembly as well as the entire floor assembly, becomes more structurally sound. In contrast, if all of the knives are attached to a lower frame assembly, the lower frame needs to be more robustly structured and consequently becomes more expensive.

The present disclosure also provides a top frame assembly and a bottom frame assembly which can both be lowered from the cab with a single operator input. Two different control inputs are not required, although the present disclosure is not limited to a single control input. This configuration allows knives to be 're-set' from the cab, or other control input location, with the single operator input.

When servicing the knives, the only potential energy of the system is provided by the springs. If a hydraulic hose fails, for instance, a knife will not raise unexpectedly, but will instead simply lock itself in place. Safety is improved, since there is no stored energy when servicing knives. While the system still can have some potential energy, any motion occurring from the release of unexpected potential energy is limited to provide safe service of the knives. Favorable ground clearance of system is provided since other known systems have spring oriented vertical, which reduces ground clearance. The simple system for positive knife engagement maintains individual knife protection. Increased clearance improves debris cleanout. The increased clearance is a result of increased ground clearance or is due to the separation of the top and bottom frame.

In other embodiments, the knife is not protected from overload, but is instead supported by other members coupled to the second frame or the alternative combinations of attaching methods described above. In the case of the knife not protected from overload, the present disclosure still applies, as it is still possible and desirable to move the top frame and the bottom frame assembly with one operator input to both enlarge the crop passageway and at least partially remove the knives from the crop passageway. In another embodiment, the knives may be protected from overload, but are not configured with the spring and roller mechanism described above, or similar members capable of applying an engaging force to the knife to push it from the protected position to the operative position. In these systems, the members supporting the knives are damaged and require replacement such as a pin that is sheared or a link that acts as a mechanical fuse. In this type of system, the present disclosure still applies, as it is still possible and desirable to move the top frame and the bottom frame assembly with one operator input to both enlarge the crop passageway and at least partially remove the knives from the crop passageway.

While embodiments incorporating the principles of the present disclosure have been disclosed hereinabove, the present disclosure is not limited to the disclosed embodiments. For instance, crop harvesting system employing a precutter type feed system including round balers (of all size and chamber types), square balers (of all sizes), and feeder wagons can be configured to incorporate the present disclosure. Also, any crop handling system which includes chopper systems for grain harvesting equipment, for example a combine chopper system, can employ the present disclosure. Consequently, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A harvesting machine, comprising:
   a main frame;
   a rotor assembly rotatably coupled to the main frame and configured to move crop material;
   a top frame movably attached to the main frame, the top frame forming a passageway for crop material between the top frame and the rotor assembly;
   a bottom frame movably attached to the top frame or main frame;
   a plurality of knives movably attached to the bottom frame or the top and bottom frames, the plurality of knives extending through slots in the top frame, the bottom frame engaging an indentation on a non-cutting edge of the knives to maintain the plurality of knives in a locked condition;
   an actuator operatively connected to one of the top and bottom frames, the top and bottom frames and the plurality of knives being in a raised position when the actuator is in a first position, and the top and bottom frames and the plurality of knives being in a lowered position when the actuator is in a second position, which enlarges the passageway between the top frame and the rotor assembly and at least partially retracts the knives through the slots in the top frame while maintaining the knives in the locked condition, wherein the bottom frame includes a plurality of rollers, wherein each of the rollers engages the non-cutting edge at the indentation in the locked condition and engages the non-cutting edge at other than the indentation in a tripped position.

2. The harvesting machine of claim 1, wherein top frame is pivotably coupled to the main frame at a main frame pivot, and the bottom frame is pivotably coupled to the top frame at a top frame pivot.

3. The harvesting machine of claim 2, further comprising a limit stop assembly operatively connected to the top frame and to the bottom frame, wherein the limit stop assembly includes a first stop configured to limit travel of the top frame about the main frame pivot and a second stop configured to limit travel of the bottom frame about the top frame pivot.

4. The harvesting machine of claim 3, wherein the limit stop assembly includes a main frame portion defining the first stop and a link defining the second stop, wherein contact of the top frame with the first stop limits the travel of the top frame, and wherein contact of the bottom frame with the second stop limits travel of the bottom frame.

5. The harvesting machine of claim 4, wherein the top frame includes a floor defining the slots, wherein each of the slots is configured to receive one of the plurality of knives.

6. The harvesting machine of claim 1, wherein a portion of each of the knives extends through the slot in the tripped position.

7. A harvesting machine, comprising:
   a main frame;
   a rotor assembly rotatably coupled to the main frame and configured to move crop material;
   a top frame movably attached to the main frame, the top frame forming a passageway for crop material between the top frame and the rotor assembly;
   a bottom frame movably attached to the top frame or main frame;
   a plurality of knives movably attached to the bottom frame or the top and bottom frames, the plurality of knives extending through slots in the top frame, the bottom frame engaging an indentation on a non-cutting edge of the knives to maintain the plurality of knives in a locked condition, and the bottom frame disengaging from the indentation in one or more of the plurality of knives so that the knives can rotate away from the rotor assembly in a tripped condition;

an actuator operatively connected to one of the top and bottom frames, the top and bottom frames in a raised position when the actuator is in a first position, and bottom frame moving to a lowered position relative to the top frame when the actuator is in a second position causing the bottom frame to reengage the indentation on the non-cutting edge of the knives, which returns the knives to the locked condition;

further comprising a limit stop assembly operatively connected to the top frame and to the bottom frame, wherein the limit stop assembly includes a first stop configured to limit travel of the top frame with respect to the main frame and a second stop configured to limit travel of the bottom frame with respect to the top frame.

8. The harvesting machine of claim 7, wherein a portion of each of the knives extends through the slot in the tripped condition.

9. The harvesting machine of claim 7, wherein the limit stop assembly includes a main frame portion defining the first stop and a link defining the second stop, wherein contact of the top frame with the first stop limits the travel of the top frame, and wherein contact of the bottom frame with the second stop limits travel of the bottom frame.

10. The harvesting machine of claim 9, wherein the top frame includes a floor defining the slots, wherein each of the slots is configured to receive one of the plurality of knives.

11. The harvesting machine of claim 7, wherein the bottom frame includes a plurality of rollers, wherein each of the rollers engages the non-cutting edge at the indentation in the locked condition and engages the non-cutting edge at other than the indentation in the tripped condition.

12. The harvesting machine of claim 11, wherein a portion of each of the knives extends through the slot in the tripped condition.

13. A harvesting machine, comprising:
a main frame;
a rotor assembly rotatably coupled to the main frame and configured to move crop material;
a top frame movably attached to the main frame, the top frame forming a passageway for crop material between the top frame and the rotor assembly;
a bottom frame movably attached to the top frame or main frame;
a plurality of knives movably attached to the bottom frame or the top and bottom frames, the plurality of knives extending through slots in the top frame;

no more than two actuators operatively connected to the top and bottom frames, the top and bottom frames and the plurality of knives being in a raised position when one actuator of the no more than two actuators is in a first position, and the top and bottom frames and the plurality of knives being in a lowered position when the one actuator is in a second position, which enlarges the passageway between the top frame and the rotor assembly and at least partially retracts the knives through the slots in the top frame;

Wherein the top frame is pivotably coupled to the main frame at a main frame pivot, and the bottom frame is pivotably coupled to the top frame or main frame at a bottom frame pivot;

a limit stop assembly operatively connected to the top frame and to the bottom frame, wherein the limit stop assembly includes a first stop configured to limit travel of the top frame about the main frame pivot and a second stop configured to limit travel of the bottom frame about the top frame pivot; and wherein the limit stop assembly includes a main frame portion defining the first stop and a link defining the second stop, wherein contact of the top frame with the first stop limits the travel of the top frame, and wherein contact of the bottom frame with the second stop limits travel of the bottom frame.

14. The machine of claim 13, wherein the top frame includes a floor defining the slots and each of the plurality of knives includes at least a portion thereof extending through the slots in both the raised position and the lowered position.

15. The machine of claim 14, wherein the one actuator includes a first position wherein the bottom frame is disposed adjacent to the top frame extending the plurality of knives through the plurality of slots, a second position wherein the top frame is spaced from the rotor assembly a distance positioning the plurality of knives in the passageway, and a third position wherein the bottom frame is spaced from the top frame a distance retracting the plurality of knives at least partially from the plurality of slots.

16. The machine of claim 13 wherein the no more than two actuators comprises a set of actuators, wherein a first one of the actuators of the set of actuators is operatively connected to a first end of one of the top and bottom frames, and a second one of actuators is operatively connected to a second end of one of the top and bottom frames.

17. The machine of claim 16 further comprising a slotted bar including a slot and having an end pivotally coupled to the top frame, wherein one of the first one and the second one of the actuators includes an end pivotally coupled to the bottom frame and configured to move along the slot of the slotted bar.

* * * * *